Figure 1:
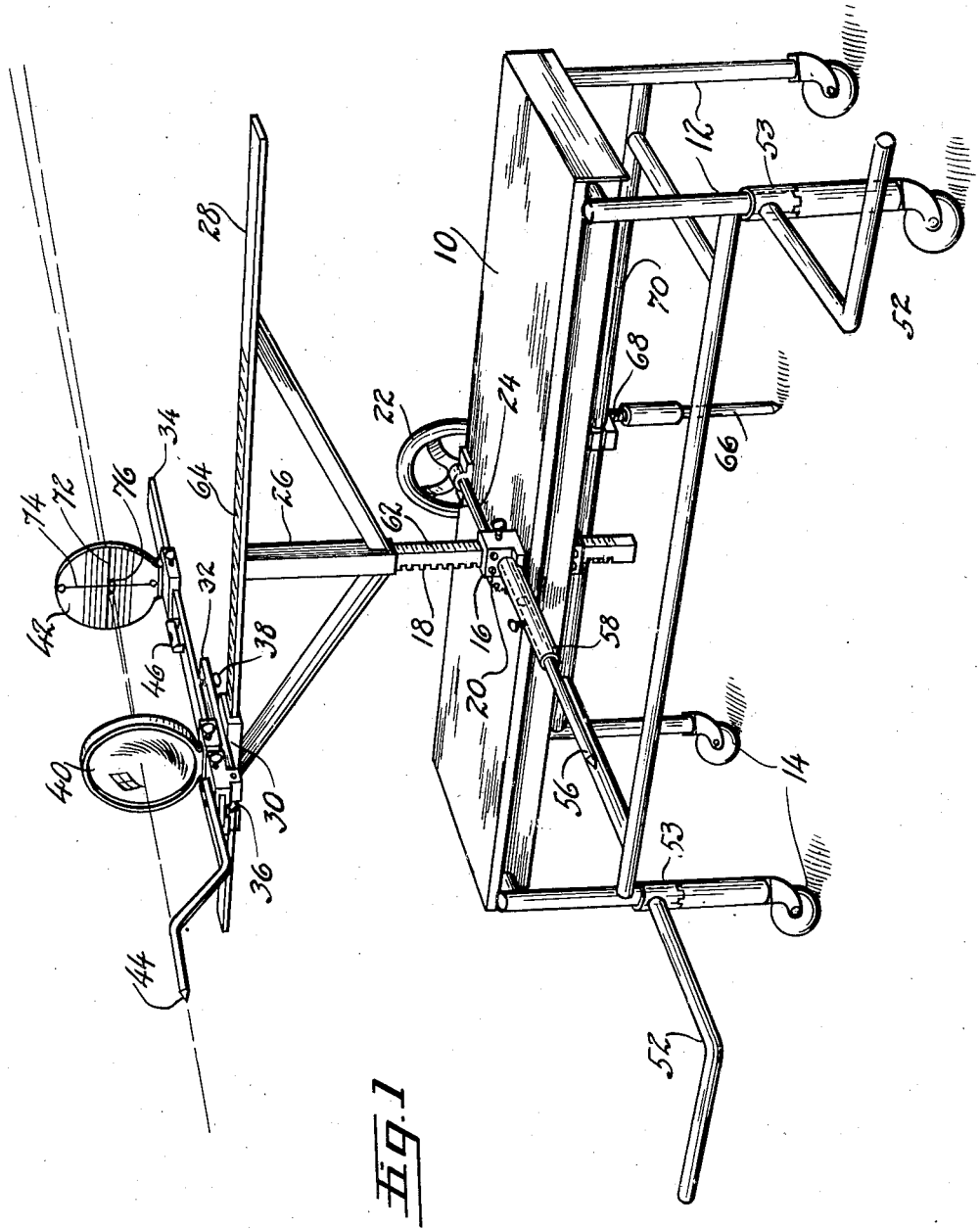

June 13, 1939.　　　　G. M. GRAHAM　　　　2,162,010
APPARATUS FOR TESTING THE HEADLIGHTS OF MOTOR VEHICLES
Filed May 29, 1936　　　3 Sheets-Sheet 1

INVENTOR.
George M. Graham
BY Parker & Burton
ATTORNEYS.

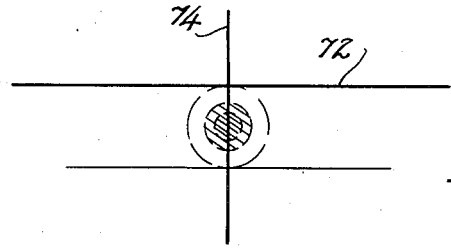
Fig. 3
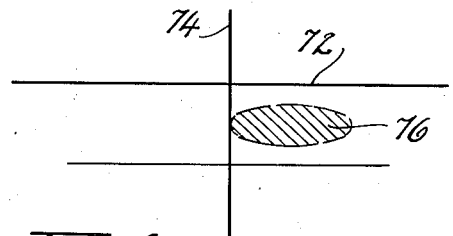
Fig. 4  LEFT
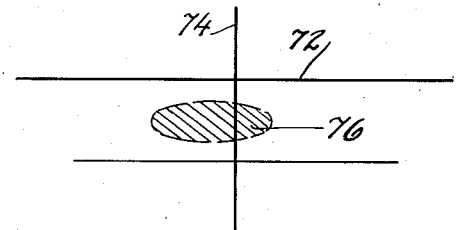
Fig. 5  RIGHT
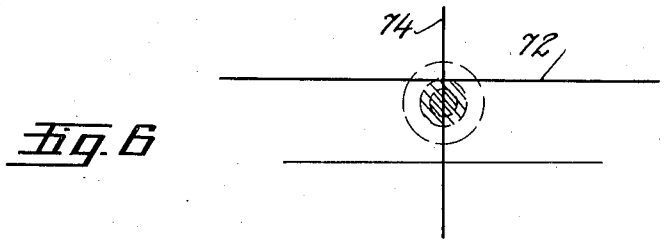
Fig. 6
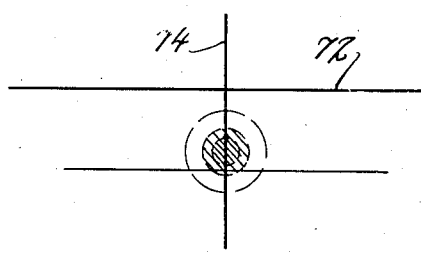
Fig. 7

Patented June 13, 1939

2,162,010

UNITED STATES PATENT OFFICE 2,162,010

APPARATUS FOR TESTING THE HEADLIGHTS OF MOTOR VEHICLES

George M. Graham, Detroit, Mich., assignor to Hinckley-Myers Company, Jackson, Mich., a corporation of Michigan Application May 29, 1936, Serial No. 82,419

9 Claims. (Cl. 88—14)

This invention relates to a novel apparatus for testing the headlights of motor vehicles.

There are certain adjustments of the headlights of a motor vehicle which most efficiently illuminate the road in front of the vehicle. These adjustments, however, must fall within limits set by the laws of the various States which, in general, require that the headlight beams be directed downwardly at a slight angle so that the drivers of approaching automobiles on the highway are not blinded. A height of forty-two inches above the road at seventy-five feet in front of the automobile is a common legal requirement for headlight beams. At the time of assembling the automobile, the headlights are usually made to function correctly and legally but it is well known that after a period of use, or following an accident, the headlights are frequently disturbed out of their proper position and the illumination is projected upon the road inefficiently and even possibly illegally.

In order to determine if the headlights were properly adjusted it has been the practice to test the headlights by shining the headlights upon a wall spaced a considerable distance in front of the vehicle and noting the effect the illumination had upon the wall. The headlights were then adjusted until proper illumination was obtained as best as could be determined from the diffused and weak character of the light at that distance. This method was unsatisfactory because it was not very accurate, took up considerable room, and required the test to be taken in darkened conditions. Other methods of testing have been employed which applied devices directly to the headlights. These devices, in general, simply determined whether the lamp bulb in the headlight was disposed in proper position relative to the reflector. None of these devices were capable of measuring and correcting all the factors pertaining to headlight illumination, nor were they capable of visually illustrating by the light beams themselves the exact condition of the headlight in all its respects.

It is an important object of this invention to provide a novel apparatus for completely testing all the factors of headlight illumination on a motor vehicle. Headlight testing operations performed by this apparatus not only determine whether the headlight itself is functioning correctly but also whether the beam of light thrown by the headlight is properly directed in front of the motor vehicle. In carrying out testing operations in accordance with this invention, the beams of light from each headlight are condensed to substantially a spot of light by a light condensing lens whose optical axis extends in true horizontal direction and parallel to the longitudinal median line of the motor vehicle. The spot of light is focussed upon a screen or surface bearing reference marks indicating a point substantially on the axis of the lens. The test is concluded by adjusting the headlight until the spot of light in properly focussed condition has been shifted to correct position as indicated by the reference marks on the screen. By this method the headlight beam will extend in correct, known direction relative to the ground and to the centerline of the vehicle. All factors of headlight illumination are thereby brought into correct alignment.

Another object of this invention is to provide an accurate and easily regulated apparatus for testing the headlights of a motor vehicle. The apparatus is provided with means for positioning the apparatus relative to the motor vehicle so that the beam of the headlight being tested can be compared and adjusted relative to the ground and the longitudinal median line of the vehicle. After the apparatus has been positioned in front of a motor vehicle, the apparatus can be operated to measure first one headlight and then the other without disturbing this position.

More specifically, the invention comprehends an apparatus having a frame or supporting table upon which are carried instruments for analyzing the beam characteristics of the headlight and for indicating the correct direction for such beam. The frame or table carries devices for trueing or squaring the table with respect to the front of a motor vehicle. These devices, as described in the embodiment of the invention herein, may include elements which engage the front of the vehicle at spaced points, such as for example the front road wheels, and an element for contacting the center of the vehicle's front section for positioning the table with reference thereto. The instruments carried by the table for testing the light beam of the headlight comprise a light condensing lens and a screen or surface upon which the light condensed by the lens is focussed. The presetting of the supporting table with respect to the front of the vehicle, disposes the lens and screen in an alignment which extends in a plane parallel to the longitudinal median line of the vehicle. Means may be provided for insuring not only that the alignment extends parallel to the plane of the centerline of the vehicle but that it also extends in a true horizontal direction. Both the lens and the screen are mounted upon a common support which is adjustable vertically and horizontally without disturbing the parallel relationship between the axis of the lens and the longitudinal centerline of the vehicle. Means is provided for indicating the amount of these adjustments relative to the ground and to the centerline of the vehicle. This enables the lens and screen to be placed in proper alignment before a headlight in accordance with the specifications of the automobile manufacturer as to the correct position of the headlights.

A meritorious feature of the invention resides in the provision of a surface or screen which represents road conditions at a certain prescribed distance ahead of the front of the vehicle. This screen is marked or otherwise arranged to indicate various heights above the road at this distance and the center of the vehicle at this distance. The headlight beam is condensed by the lens described above and focussed as a spot of light upon the screen. The spot of light indicates the actual condition of the headlight at the distance specified. If the spot of light does not fall upon the screen correctly as determined by the reference marks, the headlight is adjusted until such spot does fall correctly. This indicates that the headlight is in correct adjustment.

By concentrating the beam from the headlight to a spot or point of light focussed on a screen, a more accurate indication of the headlight condition can be obtained than otherwise because the diffuse character of the light is eliminated and the intensity of the light is increased many times. The screen and lens form in a sense a miniature setting resembling the actual road illumination in front of the vehicle. The actual road illumination of an automobile can be instantly grasped and appreciated by the owner of a vehicle witnessing such a test.

Other features of importance accompany this invention. The parts of the apparatus are readily dismountable so that the apparatus can be reduced to a compact group occupying very little space. The elements which are adapted to engage the front of a vehicle and square the apparatus with respect thereto can be swung or moved in a novel way to unobstructing positions under the supporting table when the apparatus is not in use. The lens and screen may be dismantled from their supports and shelved for protection in compartments which may be carried on the supporting table. The supporting frame or table can be arranged for movement over the floor but means may be provided for anchoring the table in fixed position after it has once been set in front of a vehicle.

Figure 2:
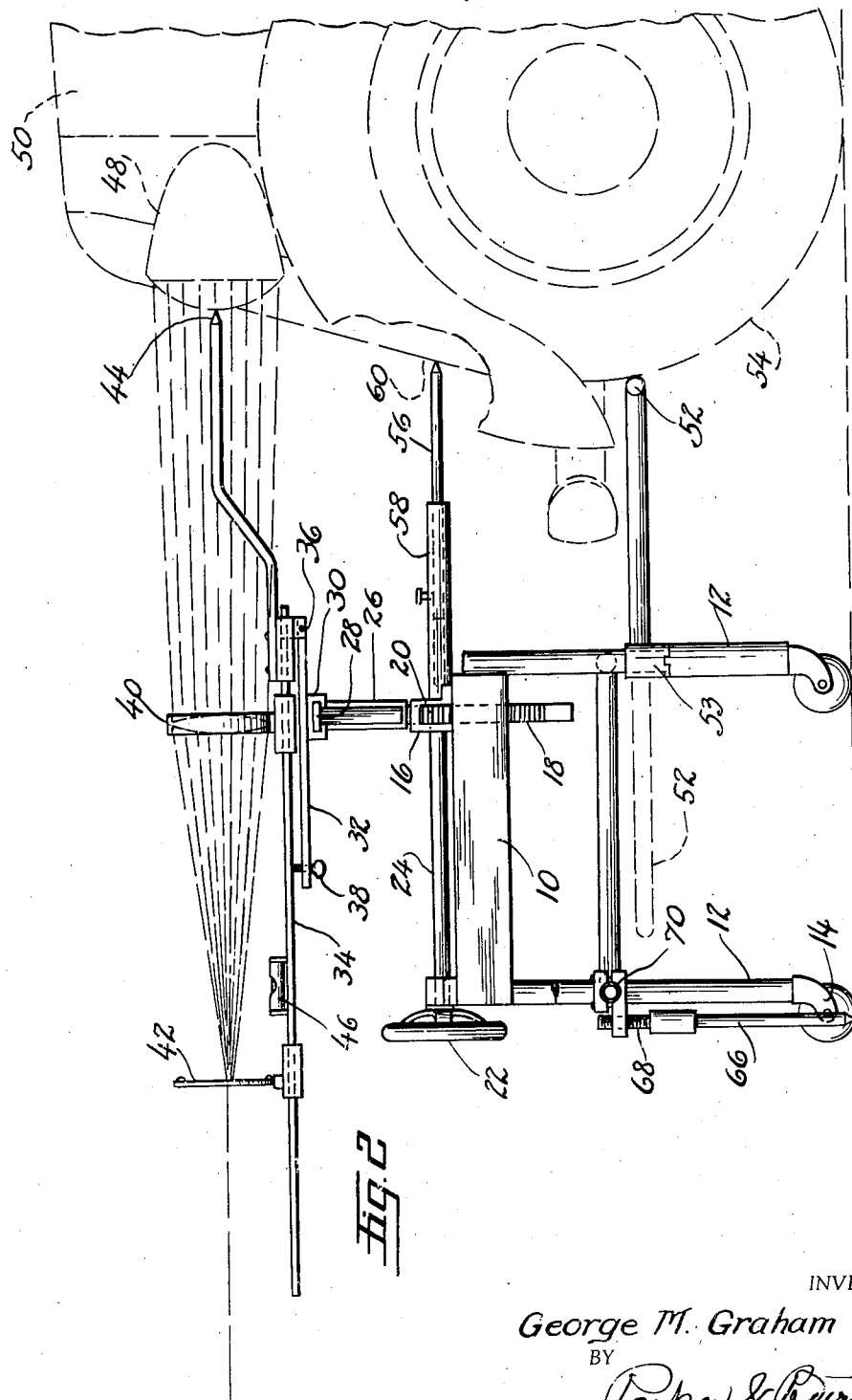

Other objects, advantages and meritorious features of the invention will become more apparent from the following specification, appended claims and accompanying drawings, wherein:

Figure 1 is a front perspective view of the apparatus showing the assembly of parts ready for test upon the headlights of a motor vehicle, Fig. 2 is a side view of the apparatus shown in Fig. 1 showing the apparatus in position adjacent the front of a motor vehicle for testing the headlights, Figs. 3, 4, 5, 6, and 7 are diagrammatic views illustrating the position of the spot of light of the headlamp beam on the screen under different conditions and wherein Fig. 3 illustrates the position of the light spot on the screen under normal average adjustment with the headlamp lens removed; Figs. 4 and 5 illustrate the position of the head lamp beam light spot on the screen with multi-beam lenses in place and for the left and right head lamps respectively; Fig. 6 illustrates the position of the head lamp beam light spot on the screen of an adjustment for fast country driving under little or no load and Fig. 7 illustrates the position of the head lamp beam light spot on the screen of an adjustment for city driving with car loaded.

Referring to the drawings, one embodiment of the invention is illustrated in Figs. 1 and 2. It comprises a frame or table 10 supported from the floor by legs 12 furnished with castors 14 for slidable movement on the floor. Fixed in the middle of the table is a guide block 16. A rack member 18 is slidably positioned in said guide block for vertical movement. A pinion 20 engages the teeth on the rack member and drives the same up or down. The pinion is rotated manually by a hand wheel 22 connected to the end of the shaft 24 upon which the pinion is secured.

Supported upon the end of the rack member is a square-shaped member 26 supporting, with the assistance of diagonal braces, a horizontally extending bar 28. Slidably mounted on this bar is a lens and screen assembly which is employed for testing the beam of light issuing from a headlight. This assembly comprises a guide block 30 slidably fitted on the bar 28. Secured to this bar is a brace member 32 extending transversely across the bar 28. A bar 34 superimposes the brace bar 32 and is hinged at one end to the forward end of the brace member by suitable mechanism 36 and is adjustably supported above the brace member intermediate its ends by an adjusting screw 38.

Slidably supported on the bar 34 are headlight testing instruments including a light condensing lens 40, a screen or disc 42, and a pointer 44. Each of these devices is slidably mounted upon the bar 34 by suitable guide blocks similar in construction to guide block 30. These devices may be secured in fixed position on the bar 34 by set screws extending through the guide blocks as indicated in Figure 1. Also carried upon the bar 34 is a bubble level gauge 46 which is adapted to function in conjunction with the adjusting screw 38 to set the bar 34 in horizontal position. The lens and screen are normally positioned upon the bar with the screen at substantially the focal length of the lens.

As illustrated in Fig. 2, the lens and screen are disposed in alignment before a headlight 48 of a motor vehicle 50 so that the headlight beam is focussed upon the screen 42. In order to position the lens and screen in proper alignment relative to the motor vehicle, the table is provided with means for squaring it in front of the vehicle. For this purpose, wheel engaging elements or bars 52 are provided. These elements are secured to the front legs of the table and are adapted to engage the tires of the front road wheels 54.

The automobile is preferably empty or at least on a level front and rear, with the tires properly inflated. When the front wheels of the motor vehicle are disposed in straight ahead position, the elements 52 position the table and the bar 28 carried thereby in proper position at right angles to the longitudinal median line of the vehicle. A pointer 56 telescopingly supported in sleeve 58 is adapted to engage with any suitable part 60 at the center of the front of the vehicle. Sleeve 58 is connected to the guide block 16 substantially on the vertical centerline of the rack member 18.

Pointed 56 functions to center the table with respect to the longitudinal median line of the vehicle. As a result, the table is squared or trued-up in front of the vehicle by the wheel engaging elements 52 and the pointer 56 so that the bar 34 upon which the lens and screen are carried extends in a plane parallel to the longitudinal median line of the vehicle. The bar 34 is adjusted by screw 38 to a horizontal position. The bubble level gauge 46 is adapted to indicate when the bar 34 extends in a true horizontal direction. When such is the case and the table has been squared in front of the vehicle as has been described, the optical axis of the lens will extend in a horizontal line parallel with the longitudinal centerline of the vehicle.

The rack member 19 is provided with a scale graduated in inches as indicated at 62 to represent the height of the center of the lens above the floor. The reading of this height may be taken off the top of the guide block 16. This height may be determined by measurement or according to measurements supplied by the manufacturer of the particular make and model of car. The horizontal bar 26 is likewise provided with a scale graduated in inches as shown at 64 to indicate distances to the right and left of the center of the bar. Since the center of the bar is disposed in vertical alignment above the pointer 56, these measured distances on the bar represent distances to the right and left of the longitudinal median line of the vehicle when the table is properly centered with respect thereto. The reading of these distances on the scale 64 can be made in any suitable manner, for example from the inner side of the guide block 30. Accordingly, from these scales it is possible to position the optical axis of the lens in alignment with the correct position of the headlights on a motor vehicle.

When the table 10 is squared up against the front of an automobile it can be anchored against movement by a floor engaging member such as that shown at 66. This member is threaded upon a depending threaded stud 68 which is secured by a bracket to the under frame member 70 on the table. Rotation of the device obviously reciprocates the pointed end of the member either upwardly or downwardly. When rotated downwardly, it is adapted to engage the floor and act in conjunction with the wheel engaging elements 52 to prevent movement of the table relative to the front of the vehicle.

The disc or screen 42 is provided with reference marks to indicate certain distances above the ground and to the right and to the left of the center of the vehicle at a predetermined distance ahead of the vehicle of the headlight beams. Most State laws require that the beams of light issuing from the headlights be below their source at 75 feet in front of the vehicle or not more than 42 inches above the ground at this distance. In accordance with these regulations the disc can be marked to indicate these measurements at 75 feet. The heavy horizontal line 72 in the center of the disc may be arranged to indicate a height of 42 inches at 75 feet of the headlight beam when the spot of light directed on the disc by lens 40 is centered on vertical line 74 directly below line 72 as shown in Fig. 3. The plurality of horizontal lines above and below the heavy center horizontal line 72 may indicate other heights of the headlight beam above the ground at 75 feet distance or any distance upon which it is desired to base the measurement. Obviously the screen 42 may be calibrated as desired. Each horizontal line, for example, may indicate a difference in height of ten inches or five inches or whatever measurement scale is desired.

According to these regulations the spot of light condensed by the lens should be focussed on the disc slightly below the horizontal centerline 72 and substantially centered across the vertical line 74. When the beam of light from the headlight is focussed to such a position, the headlight is in correctly focussed condition for average normal adjustment. This is illustrated in Fig. 3. This test is made with the headlight lenses removed. If the spot of light does not strike the place called for on the screen, the headlight should be adjusted until the spot is shifted to the correct position.

If the test is made with the well known multi-beam headlight lenses in place, the "hot spot" of light on the screen will be differently positioned and shaped as shown in Figs. 4 and 5. Fig. 4 represents the beam spot from the left headlight lens and Fig. 5 the beam spot from the right lens for a correct adjustment as, for example, 42 inches as to height and correct as to lateral dispersion of beam for a distance of 75 feet in front of the vehicle. Such spots of light are oval in shape with the longer axis extending horizontally. Such a spot of light is indicated at 76 in Fig. 1. This shape results because most headlights are constructed to throw the beam with considerable more lateral spread than vertical spread. The testing apparatus visualizes the actual condition of the headlight and can be considered as reducing to miniature the illumination actually projected by the motor vehicle head lamps on the road.

The desired position of the beam may vary depending upon the conditions under which the vehicle is normally used. For fast country driving under little or no load it may be desirable to illuminate the road for a longer distance ahead than for normal average driving and the position on the screen of the light spot as shown in Fig. 6 may be correct when the test is made with the head lamp lens removed and with the car unloaded. For driving with a loaded car in the city the position on the screen of the light spot as shown in Fig. 7 may be the correct one when the test is made with an unloaded car and with the headlight lens removed.

The wheel engaging elements 52 may be arranged for removal or swingable to a position under the table when not in use. As illustrated, each element is supported from a sleeve 53 rotatably mounted on a leg of the table. In this manner they are adapted to be swung to an inoperative position under the table as indicated by the dotted lines in Fig. 2. Notches may be cut in the sleeve and the leg so that when the elements are projecting in correct position in front of the table they are releasably locked against movement.

The headlight engaging pointer 44 may be used in conjunction with the scales 62 and 64, or by itself as the case may be, to center the lens in correct position in front of a headlight. By adjusting the bar 34 both vertically and horizontally, the pointer 44 can be shifted until it centers on the lens of the headlight.

Summarizing the method of testing headlamps with the use of the device herein disclosed the vehicle is placed on a level unloaded with tires properly inflated and preferably the headlamp lenses are removed. The apparatus is then centered in front of the car with the squaring bars 52 touching the front wheels. The testing instrument is adjusted to the correct height and centered in front of the lamp to be tested and leveled as hereinabove set forth. The bright light of the car headlamp is switched on and test made as described.

What I claim is:

1. Apparatus for testing the headlights of a motor vehicle comprising, in combination, a table, a T-shape standard mounted upon the table for vertical adjustment with respect thereto, the head of said standard being graduated lengthwise and extending parallel to the length of the table, a bar supported upon said head for adjustment lengthwise of the graduated portion thereof, said bar extending crosswise of said head at right angles thereto and provided with level indicating means, and means for adjusting the bar upon the head to a horizontal position as indicated by said level indicating means, a light condensing lens mounted upon one end of the bar, a screen mounted upon the other end of the bar and adapted to receive the light condensed by said lens, a pointer on the bar projecting forwardly of the lens and having the axis of the outer end section of the pointer substantially coincident to the axis of the lens, means carried by the table adapted to engage the two front wheels of a motor vehicle the headlights of which are to be tested to position the head normal to the longitudinal centerline of the vehicle, means carried by the table adapted to contact the front of the vehicle to center the table with respect to the longitudinal centerline of the vehicle so that the graduations on said head measure known distances in opposite directions from the centerline of the motor vehicle.

2. Apparatus for testing the headlights of a motor vehicle comprising, in combination, a table, a T-shape standard mounted upon the table for vertical adjustment with respect thereto, the head of said standard extending parallel to the length of the table and being graduated for a portion of its length, a supporting bar mounted upon said head for slidable adjustment lengthwise of the graduated portion thereof, said bar extending crosswise of said head, a light condensing lens mounted upon said bar, a screen mounted upon said bar to receive the light condensed by said lens, a pointer mounted upon the bar extending forwardly of said lens, means mounted upon the table adapted to be swung from an inoperative position adjacent to the table to an operative position projecting away from the table and adapted to engage the two front wheels of the vehicle the headlights of which are to be tested to position the table with the axis of the lens parallel to the longitudinal centerline of the vehicle.

3. An apparatus of the character described including a table, a T-shape standard mounted upon the table for adjustment vertically with respect to the table and having a length at least equal to the distance between the front headlights on a motor vehicle, such standard so mounted upon the table that the head of the standard extends parallel to the length of the table, a support mounted crosswise upon said head for slidable adjustment longitudinally thereof, a condensing lens carried by said support, a screen carried by said support in position to receive the light condensed by said lens, a pointer carried by said support and projecting forwardly of said lens, wheel engaging means carried by the table and adapted to engage the two front wheels of a motor vehicle the headlights of which are to be tested to position the table normal to the longitudinal centerline of the vehicle, means carried by the table adapted to center the same with respect to the longitudinal centerline of the vehicle, said lens and screen carrying support slidable longitudinally of the head of the standard for positioning in front of either the right or left head lens of the vehicle.

4. An apparatus of the character described including, in combination, a frame, a T-shape standard mounted upon the frame for vertical adjustment with respect thereto, the horizontal head of said T-shape standard having a length at least substantially equal to the distance separating the front headlights of motor vehicles, means mounted upon said frame adapted to be swung from an inoperative position adjacent to the frame to an operative position projecting from the frame and adapted in the latter position to contact the front wheels of a vehicle the headlights of which are to be tested to position the frame with the horizontal head of said standard at right angles to the longitudinal median line of the vehicle, and a supporting bar mounted upon said head for slidable adjustment lengthwise thereof and extending at right angles thereto, said bar carrying headlight testing instrumentalities.

5. An apparatus of the character described including a frame having floor engaging wheels for movability, a T-shape standard mounted upon the frame for adjustment vertically with respect to the frame, the top horizontal portion of said T-shape standard having a length at least equal to the distance between the front headlights of motor vehicles, means mounted upon said frame adapted to be swung from an inoperative position adjacent to the frame to an operative position projecting away from the frame and adapted in operative position to engage the two front road wheels of a vehicle the headlights of which are to be tested to position the frame with the top horizontal portion of the T-shape standard at right angles to the longitudinal median line of the vehicle, means slidably supported upon the top horizontal portion of said T-shape standard and carrying aligned headlight testing instrumentalities, said means adapted when the frame is properly positioned in front of the vehicle to be slidably adjusted to positions aligning the testing instrumentalities with either one or the other of the headlights on the vehicle, and means on the side of the frame opposite to said vehicle wheel contacting means for releasably engaging the floor and when said vehicle wheel contacting means is properly engaging the front wheels of a vehicle to hold the frame up against the vehicle so that it is immovable during testing operations.

6. An apparatus of the character described including, in combination, a frame, a support mounted upon said frame for vertical adjustment and extending horizontally a distance at least equal to the distance between the headlights of a motor vehicle, a brace slidably carried upon the top of said support for horizontal movement from one end thereof to the other, a member superimposed on said brace and extending crosswise of the length of the support, means connecting said member to said brace for pivotal movement about a horizontal axis parallel to the length of said support, a level indicating device carried by said member, and means associated with said brace and member for adjustably supporting the latter from the former at a point spaced from said axis so that the member may be tilted to a level position about the axis, said member carrying an upright light condensing lens element adjacent its forward end and a reference screen element at substantially the focal plane of said lens.

7. Apparatus for supporting a headlight testing device comprising, in combination, a movable frame, a support on said frame having a length at least equal to the distance between the headlights of a motor vehicle, a brace slidably mounted on said support for movement longitudinally thereof a distance equal at least to the distance between the headlights of a motor vehicle, a member pivotally connected to said brace about an axis extending parallel to the length of said support, adjustable means for supporting the member relative to the brace and adapted upon adjustment to swing the member about said pivotal axis and vary the inclination of the member relative to said brace, said member carrying headlight testing instrumentalities extending in alignment normal to the length of said support, and means carried by the frame for engaging the front of a motor vehicle at spaced points thereon to preset said support in a plane normal to the longitudinal centerline of the vehicle whereby the headlight testing instrumentalities carried by said member are disposed in an alignment parallel to the centerline of the motor vehicle.

8. Apparatus for supporting a motor vehicle headlight testing device comprising, in combination, a substantially horizontal support having a length at least equal to the distance between the headlights of a motor vehicle, a brace slidably mounted on said support for movement longitudinally thereof a distance equal at least to the distance between the headlights of a motor vehicle, a member carrying headlight testing instrumentalities including a level indicating device, means for pivoting said member to said brace about a horizontal axis, and means carried by said brace adjustably supporting said member relative thereto and adapted upon adjustment to swing the member about said pivotal axis and vary the inclination of the member relative to the brace.

9. Apparatus for supporting a motor vehicle headlight testing device comprising, in combination, a substantially horizontal support having a length at least equal to the distance between the headlights of a motor vehicle, a member movable longitudinally along said support a distance at least equal to the distance between the headlights of a motor vehicle, a second member carrying headlight testing instrumentalities including a level indicating device disposed in alignment, means pivoting said second member to said first member about a horizontal axis extending perpendicular to the alignment of said headlight testing instrumentalities, and adjustable supporting means between said first and said second members adapted upon adjustment to swing the second member about its pivotal connection to the first member and thereby vary the inclination of the alignment of said testing instrumentalities.

GEORGE M. GRAHAM.